Patented Sept. 11, 1951

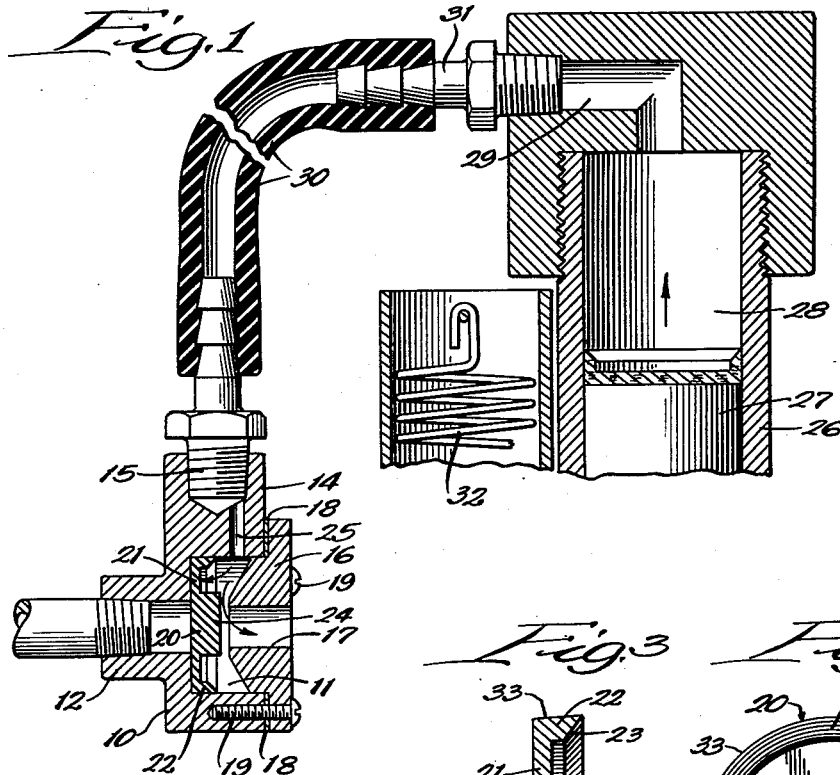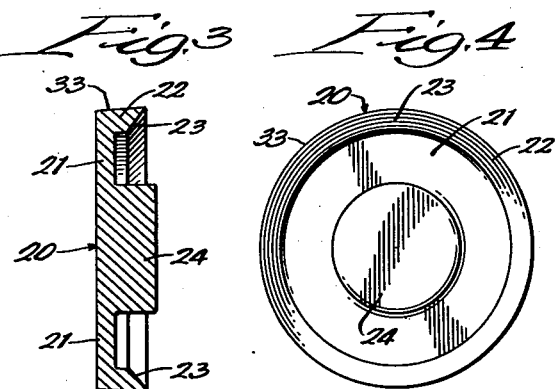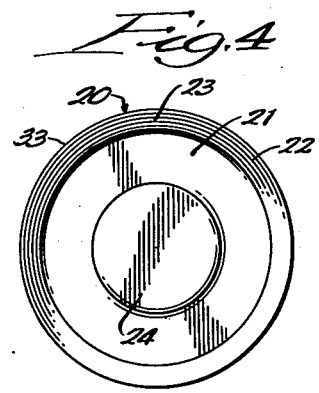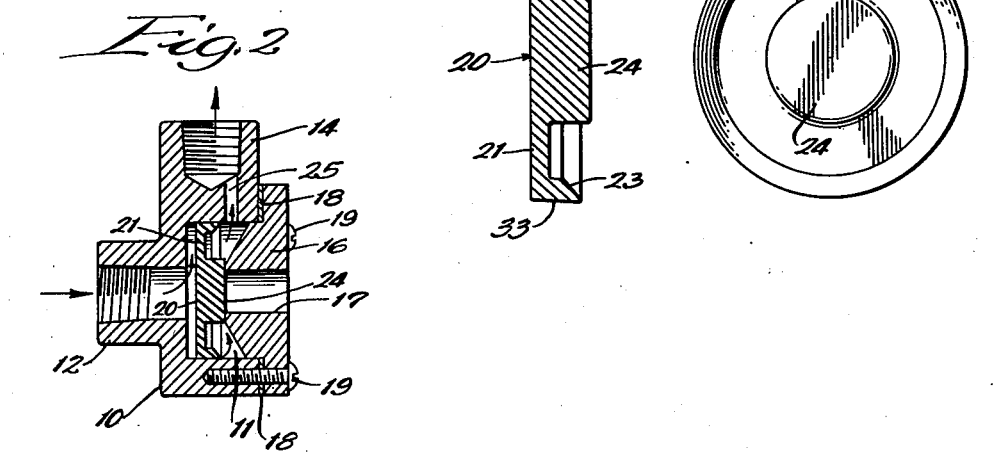

2,567,391

UNITED STATES PATENT OFFICE 2,567,391

EXHAUST VALVE STRUCTURE

Theodore E. Mead, Wilmette, Ill.

Application June 27, 1946, Serial No. 679,656

5 Claims. (Cl. 251—118)

This invention relates to exhaust valve structure and more particularly to a quick acting exhaust valve for use with a compressed air work cylinder and the like.

An object of the invention is to provide a simple and compact structure which may be interposed in the compressed air line leading to a work cylinder for quickly exhausting the air from the work cylinder when the pressure in the line leading from the source of pressure drops. A further object is to provide a quick acting exhaust valve which has a single operating part within the valve chamber and effectively feeds compressed air to the cylinder while upon a reversal of flow from the cylinder, and upon the cutting off of air pressure in the line, the valve opens an exhaust port for quickly removing the compressed air from the cylinder. Such quick acting exhaust is extremely important in connection with the high-speed operation rams, etc. Other specific objects and advantages will appear as the specification proceeds.

The invention is illustrated, in a preferred embodiment, by the accompanying drawing, in which—

Figure 1 is a broken vertical sectional view of valve apparatus embodying my invention and shown in use with the compression chamber of a work cylinder; Fig. 2, a vertical sectional view of the valve structure with the valve shown in sealing position with respect to the exhaust port; Fig. 3, a vertical sectional view on an enlarged scale of the valve employed; and, Fig. 4, a rear view in elevation of the valve shown in Fig. 3.

In the illustration given, 10 designates a casing of aluminum, steel or other suitable material which provides a valve chamber 11. On the front end of the cylindrical casing is an integral extension 12 which is apertured and threaded to receive the inlet pipe 13. One side of the cylindrical casing is provided with an integral boss extension 14 threaded to receive the coupling member 15 leading through suitable connections to the work cylinder or other structure. The rear end of the cylindrical chamber 11 is closed by a back wall 16 provided centrally with an exhaust port 17. The wall 16 has a central portion which extends inwardly toward the inlet pipe 12. A gasket 18 may be provided for sealing the casing and screws 19 are employed for securing the wall or closure 16 in position, as illustrated best in Figs. 1 and 2.

Within the cylindrical chamber 11 is freely mounted a valve member 20. The member 20 is provided with a front wall portion 21 and with a peripheral rearwardly-extending annular flange or lip 22. The lip flange 22 may be cut away along a bevel at 23, as indicated best in Figs. 3 and 4. Projecting rearwardly from the front wall 21 is a buffer or sealing member 24 which is adapted to engage the forwardly-extending port 17 of the rear wall 16 and to seal it when the valve is in the position shown in Fig. 2.

Communicating between the fitting 15 and the valve chamber 11 is a port 25 through which air may flow from the valve chamber to the work cylinder and vice versa. The passage 25 is located toward the rear wall 16 and thus at the rear of the sealing flange 22 when the valve 20 is in sealing position, as illustrated in Fig. 2. In order to provide for a large volume of air, the passage 25 is preferably elongated transversely so that a substantial volume of air can pass quickly from the coupler fitting 15 to the valve chamber 11.

It will be understood that the valve structure as described may be employed in connection with any type of air driven or fluid driven mechanism. In the specific illustration given, I have shown a compressed air cylinder 26 in which is slidably mounted a ram 27. Above the cylinder is a compression chamber 28 to which compressed air is fed through the conduit 29. A flexible hose 30 joins the coupler 15 and the coupler 31 communicating with conduit 29. The specific fluid driven mechanism just described is shown in detail in my copending application, Serial Number 633,828 for air ram. In the operation of such a structure, the ram 27 is driven downwardly under the force of pressure and is returned to its starting position at a later moment by means of a spring 32. Air is exhausted from the cylinder through the conduits and through the exhaust port 17 of the valve structure. It will be understood that the particular work cylinder apparatus is purely illustrative of the many types of fluid driven forms of mechanism with which the valve structure, embodying my invention, may be employed.

The valve 20 may be formed of any suitable material which will provide a flexing peripheral flange 22 permitting the flow of air in one direction but preventing flow in the other direction. I have obtained excellent results with an integral valve formed of rubber or synthetic rubber. Various composition materials providing a yielding resilient quality are very satisfactory. Improved results have also been obtained by having the outer peripheral edge of the valve member 20 inclined slightly outwardly and rearwardly at 33.

This structure provides an outer flange which is constantly effective as a sealing member, while at the same time yielding under pressure to permit the flow of air or other fluid into passage 25.

*Operation*

In the operation of the mechanism illustrated, compressed air, or other fluid, enters the valve chamber through the inlet 12 and forces the valve 20 to the position illustrated in Fig. 2.

The air escapes around the peripheral flange 22 and passes outwardly through the port 25 which is uncovered. At the same time, the air is prevented from flowing through exhaust port 17 by the sealing hub or projection 24. When the feed of compressed air is discontinued, pressure drops on the inlet side of the valve 20 while the pressure on the outlet side remains constant. Compressed air therefore flows from the compression chamber 28 of the work cylinder backwardly through the line into passage 25 and valve chamber 11. The pressure forces valve 20 back to the position shown in Fig. 1 and the air can thus quickly escape through the large exhaust port 17. In the latter operation, the beveled flange 22 of the valve seals the inlet opening against the passage of air in that direction.

The specific structure illustrated for the valve 20 and also for the rear wall 16 may be modified widely, if desired. For example, the rear wall 16 may be left substantially straight and in a single plane while the hub member 24 may be considerably extended to seal the opening in such a rear wall 16. Further, if desired, the bumper or hub portion 24 of the valve 20 may be omitted and the rear wall 16 may be extended centrally forwardly to a position where it will engage the front wall 21 of valve 20. I prefer, however, the structure shown because the hub body 24 remains in excellent balance with the remaining part of the structure and its deep body furnishes an effective seal for the port 17.

While in the foregoing specification, I have set forth certain details of structure for the purpose of illustrating one mode of operation of the invention, it will be understood that such structure may be modified widely by those skilled in the art without departing from the spirit of my invention.

I claim:

1. An exhaust valve structure, comprising a casing providing a valve chamber with a fluid inlet in the front end, an exhaust outlet on the opposite end, and a port extending laterally through a side of the casing adjacent the rear thereof, and a resilient valve frictionally slidable in said chamber and comprising a cup-shaped body with the lip flange thereof having its free edge extending toward said exhaust outlet, said lip flange contacting the interior wall of said valve chamber throughout its periphery, said valve having also a central portion adapted to engage and seal said exhaust outlet and to space said lip flange from said lateral port.

2. An exhaust valve structure adapted for use with a fluid driven work cylinder and the like, comprising a casing providing a cylindrical valve chamber with a fluid inlet in front and an exhaust outlet in the rear and providing also a lateral port extending through the side of the casing adjacent the rear thereof for communication with said work cylinder, and a resilient valve frictionally slidable in said chamber and comprising a cup-shaped body with a flexible lip flange contacting throughout its periphery the interior wall of said valve chamber, said valve having also a central portion adapted to engage and seal said exhaust port and to space said lip flange from said lateral port.

3. An exhaust valve structure adapted for use with a fluid driven work cylinder and the like, comprising a casing providing a cylindrical valve chamber with a fluid inlet in front and an exhaust outlet in the rear and providing also a lateral port extending through the side of the casing and adjacent the rear thereof for communication with said work cylinder, and a resilient valve frictionally slidable in said chamber and comprising a cup-shaped body with a flexible lip flange contacting throughout its periphery the interior wall of said valve chamber, said valve having also a central portion adapted to engage and seal said exhaust port and to space said lip flange from said lateral port, said rear wall having a central portion extending forwardly toward said valve and through which said exhaust outlet extends.

4. An exhaust valve structure adapted for use with a fluid driven work cylinder and the like, comprising a casing providing a cylindrical valve chamber with a fluid inlet in front and an exhaust outlet in the rear and providing also a lateral port extending through the side of the casing and adjacent the rear thereof for communication with said work cylinder, and a resilient valve frictionally slidable in said chamber and comprising a cup-shaped body with a flexible lip flange contacting throughout its periphery the interior wall of said valve chamber, said valve having also a central portion adapted to engage and seal said exhaust outlet and to space said lip flange from said lateral port, said valve having its central valve sealing portion extending rearwardly of said valve and toward said exhaust outlet.

5. In combination with a casing providing a cylindrical valve chamber having at one end an inlet and at the opposite end an exhaust port and along one side at the rear of the casing a port communicating with a work chamber, a valve made of resilient material and frictionally mounted within said work chamber for movement back and forth therein, said valve being provided with a rearwardly-extending lip flange and with a central portion adapted to seal said exhaust port, said lip flange contacting the interior wall of said valve chamber throughout its periphery, said valve and said rear wall of the casing cooperating to maintain said port leading to a work cylinder in communication with said inlet port upon application of pressure through said inlet port.

THEODORE E. MEAD.

REFERENCES CITED

The following references are of record in the file of this patent:

UNITED STATES PATENTS

| Number | Name | Date |
| --- | --- | --- |
| 1,412,473 | Lane | Apr. 11, 1922 |
| 1,506,012 | Lewis | Aug. 26, 1924 |
| 2,040,580 | Vorech | May 12, 1936 |
| 2,135,004 | Heidloff | Nov. 1, 1938 |